July 20, 1965 WOO F. CHOW 3,196,288

SHIFTING REGISTER EMPLOYING TUNNEL DIODE STAGES

Filed Dec. 24, 1962 3 Sheets-Sheet 1

INVENTOR
WOO F. CHOW

BY J. Donald Weber, Jr.

AGENT

July 20, 1965 WOO F. CHOW 3,196,288

SHIFTING REGISTER EMPLOYING TUNNEL DIODE STAGES

Filed Dec. 24, 1962 3 Sheets-Sheet 2

July 20, 1965 WOO F. CHOW 3,196,288

SHIFTING REGISTER EMPLOYING TUNNEL DIODE STAGES

Filed Dec. 24, 1962 3 Sheets-Sheet 3

United States Patent Office 3,196,288
Patented July 20, 1965

3,196,288
SHIFTING REGISTER EMPLOYING TUNNEL DIODE STAGES

Woo F. Chow, Horsham Township, Pa., assignor to Sperry Rand Corporation, New York, N.Y., a corporation of Delaware Filed Dec. 24, 1962, Ser. No. 246,802
10 Claims. (Cl. 307—88.5)

This invention relates to a system of cascaded circuits each of which operates on an electrical signal. More particularly, each of the circuits includes a bistable element capable of at least temporarily storing the electrical signals and the information represented thereby. The circuits are connected and adapted for the shifting of the information therein to adjacent circuits.

In the present state of technology and art, it is often required that high speed computing or business machines such as digital computers are required. Therefore, there has developed a great deal of interest in producing various types of high speed calculating machines. In the related industry, there has been evident a trend toward faster and faster operating machines. This emphasis on speed requires that each and every circuit, and sub-system in the machine be capable of operating extremely rapidly. In order to fabricate circuits and sub-systems which can operate at high speeds, it has become necessary to develop high speed operating components which may be utilized within the circuits. A typical such component is the tunnel diode. Much information has been presented in regard to the operating characteristics of tunnel diodes; therefore, additional discussion of this component is deemed unnecessary.

One of the sub-systems or circuits which is utilized in computing machines is a shifting register. Various types of shifting registers have been suggested in the past and the basic concept involved therein need not be more fully developed here. However, in order that the high speed machines may utilize shifting registers, the instant invention has been developed wherein a shifting register has been designed utilizing high-speed, tunnel diode operation.

Basically, the circuit comprises a plurality of individual circuits each of which is capable of storing information. The information is stored by the tunnel diode which is capable of bistable operation wherein each stable operational state represents a predetermined type of information. The individual circuits are interconnected or cascaded to form a plurality of circuits capable of receiving information from the adjacent circuits (in either direction) and storing this information. The operating state of the tunnel diode is dependent upon the information applied thereto. The information is applied via a transformer which is controlled by the application of switching signals thereto. The switching signals are applied to the transformer via unidirectional conducting devices which are, in turn, controlled by signal conditions at the inputs or outputs of the individual circuits.

Thus, it may be seen, one object of this invention is to provide a high speed shift register.

Another object of this invention is to provide a high speed shift register using tunnel diodes.

Another object of this invention is to provide a high speed shift register using only one tunnel diode per stage.

Another object of this invention is to provide a high speed shift register system wherein D.C. bias potentials are used.

Another object of this invention is to provide a high speed shift register wherein a single shifting pulse is applied to each of the individual circuits in the sub-system.

Another object of this invention is to provide a high speed shift register wherein information is stored statically and is available at any time after the transient of the shifting action.

Another object of this invention is to provide a high speed shift register which operates on level or pulse-type signals.

Another object of this invention is to provide a high speed shift register wherein the circuitry is symmetrical whereby information can be shifted to the left or to the right.

Another object of this invention is to provide a high speed shift register utilizing tunnel diodes and having substantially non-critical circuit tolerances.

Another object of this invention is to provide a high speed shift register which is capable of either synchronous or asynchronous operation.

These and other objects of this invention will become more readily apparent with the reading of the following description when taken in conjunction with the attached drawings, in which.

Figure 1:
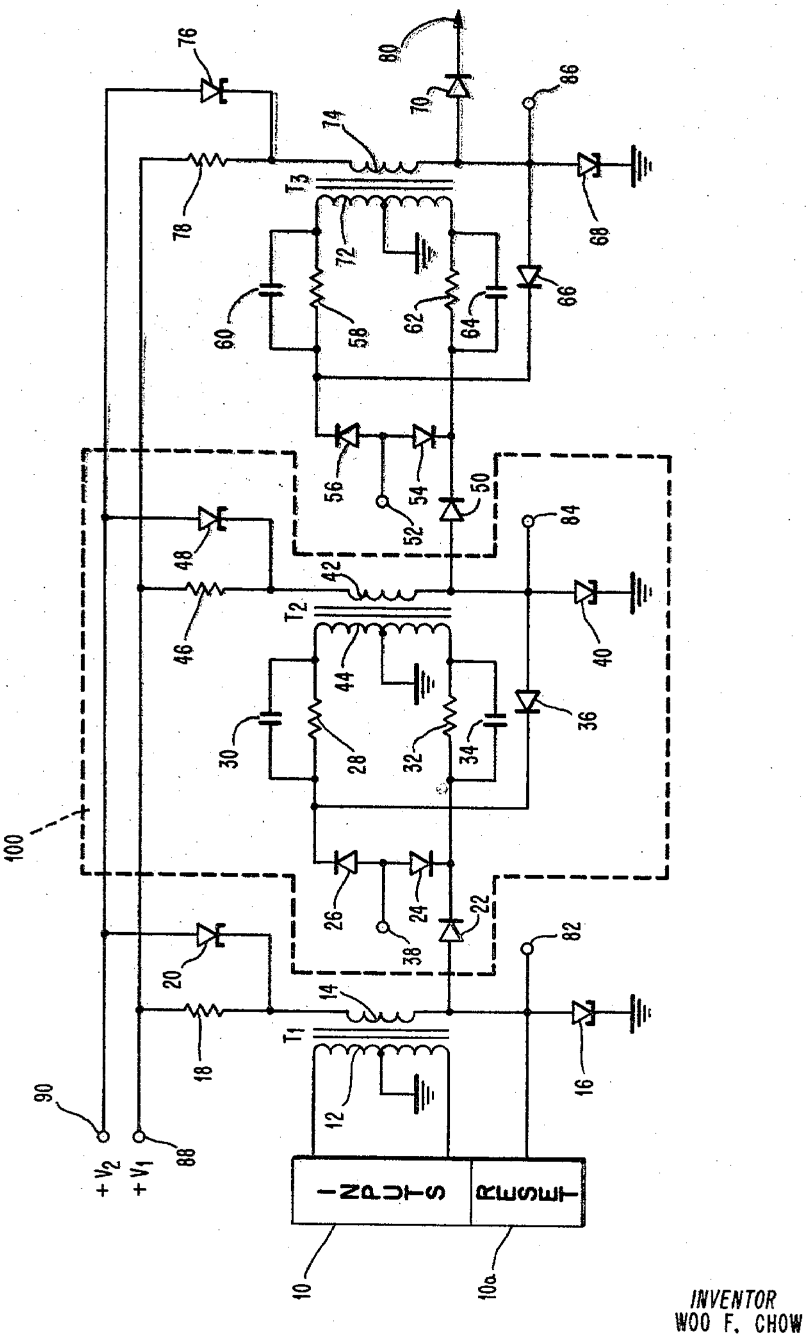
FIGURE 1 is a schematic diagram of the instant circuit in cascaded form.

Referring now to FIGURE 1, there is shown a schematic diagram of one embodiment of the instant invention. This embodiment of the invention comprises a plurality of identical, basic, circuits cascaded together in order to form a shifting register. A basic circuit under consideration is enclosed by dashed lines 100. For convenience the shifting register will be called a sub-system while each of the individual circuits will be termed a circuit. The input to the sub-system may be provided by any type of input device 10. Input device 10 may be considered as being a circuit similar to the circuits shown in FIGURE 1 or it may be considered to be some other type of device which is capable of supplying input signals in the form of levels or pulses. In the form shown, however, it is to be understood that input device 10 should be a double-ended output device in order to properly supply input signals to transformer $T_1$. It is to be understood, of course, that a modification may be made in the input to the sub-system whereby input device 10 may be a single-ended output device. As shown, the double-ended output of input device 10 is connected to different terminals of primary winding 12 of transformer $T_1$. In the double-ended output configuration, primary winding 12 is a center-tapped winding with the center-tap connected to a reference potential source, for example ground. Transformer $T_1$ may be any type of conventional transformer, preferably with high speed operating characteristics, and having a step-down ratio of 2:1. Thus, the application of a signal to either section of winding 12 will induce a signal in the secondary winding 14 of transformer $T_1$. The signals induced in winding 14 must be of sufficiently large magnitude to switch the state of the associated tunnel diode (see infra). One terminal of secondary winding 14 is connected to potential source 88 via resistor 18. Potential source 88 which may be about +9 volts with respect to ground and resistor 18 which may be approximately 1000 ohms, provide a substantially constant current source which is connected to tunnel diode 16 via secondary winding 14. The constant current source is connected to the anode of the tunnel diode 16 the cathode of which is connected to another potential source, for example, ground. The constant current source is selected to bias tunnel diode 16 (RCA 1N3853) in the bistable operating condition.

For the suggested tunnel diode which has a peak current of about 10 milliamperes, a signal having a magnitude of about 1.5 milliamperes is required for switching.

A reset source 10a which may be associated with the input source 10, if desirable, is connected to the anode of tunnel diode 16. The reset source is any conventional type of source which can selectively provide signals which are negative going with respect to ground, such that the tunnel diode 16 may be reset to the low level operating condition which is defined as the initial operating condition. An output terminal 82 is also connected to the anode of tunnel diode 16 whereby a "parallel" output may be obtained. This parallel output is, of course, not essential to the operation but is an added advantage which may be achieved. In parallel with the resistor 18, there is connected a backward diode 20. The backward diode which may be a type RCA 1N3862 backward diode has the cathode thereof connected to the secondary winding 14 and the anode thereof connected to potential source 90. Potential source 90 may be any conventional type of source, which is capable of supplying a potential on the order of about +450 millivolts. Moreover, it should be understood that backward diode 20 need not be utilized in the event that resistor 18 is a low impedance element. That is, if sufficient current can be produced through resistor 18, the low impedance backward diode path may be eliminated.

The anode of tunnel diode 16 is further connected to the anode of coupling diode 22. Coupling diode 22 actually represents one of the parallel outputs of the circuit. Diode 22 may be any conventional type of rectifier diode, as for example a ID 5–050 type diode. The cathode of diode 22 is connected to the cathode of diode 24. The anode of diode 24 is connected to the anode of diode 26. Control diodes 24 an 26 may be similar to diode 22 in operating characteristics. The common junction of the anodes of diodes 24 and 26 is connected to shifting pulse source 38. Source 38 may be any conventional type of source which is capable of supplying periodic pulses, which may be regularly recurring if desirable, and having a magnitude of about 0.5 volt. The cathodes of diodes 24 and 26 are each connected to a network comprising a resistor and capacitor connected in parallel. Resistors 28 and 32 may each be about 200 ohms and are used to provide a potential difference thereacross between the cathode of the associated diode and the winding 44. Likewise, capacitors 30 and 34 may each be about 10 picofarads and are used to provide a low impedance path for the clock pulse. The other terminals of the network (resistors and capacitors) are connected to different terminals of primary winding 44 of transformer $T_2$. Again, transformer $T_2$ is similar to transformer $T_1$. Primary winding 44, similar to primary winding 12, is a center-tapped winding with the center tap being connected to a potential source, for example ground. Secondary winding 42 of transformer $T_2$ is connected to a substantially constant current source comprising potential source 88 and resistor 46 which may be about 1000 ohms. Backward diode 48 is connected between secondary winding 42 and source 90. Again, backward diode 48 provides a low impedance current path that may be eliminated in accordance with the current requirements of tunnel diode 40 and whether the requirements are met by the circuit comprising resistor 46. Another terminal of winding 42 is connected to the anode of tunnel diode 40 which has the cathode thereof connected to a potential source, for example ground. A parallel output terminal 84 is connected to the anode of tunnel diode 40. The anode of coupling diode 36 is connected to the anode of tunnel diode 40. The cathode of diode 36, which may be similar to the conventional diodes previously noted, is connected to the cathode of diode 26.

Clearly then, the diodes 24 and 26 are the diodes by which the switching signals are selectively applied from source 38 to transformer $T_2$. The diodes 22 and 36 are the diodes by which bias potentials are supplied to the coupling diodes 24 and 26 to determine the conducting states thereof. The bias potentials are determined by the operating state of tunnel diodes 16 and 40. Thus, when a tunnel diode is in the high voltage state, a reverse biasing potential is applied to a control diode via a coupling diode. On the other hand, however, when a tunnel diode is in the low voltage state, a zero biasing potential is applied to a control diode via a coupling diode such that a signal supplied by a shifting pulse source may be transmitted to a transformer winding.

An additional stage of the shifting register is shown and is identical to the previously described stages of the circuits. The coupling diode 50 has the anode thereof connected to the anode of tunnel diode 40. The cathode of diode 50 is connected to the cathode of control diode 54. The anode of diode 54 is connected to the anode of control diode 56. The anodes of the control diodes 54 and 56 are each connected to the shifting pulse source 52 which is similar to pulse source 38. Again, the cathodes of control diodes 54 and 56 are each connected to separate capacitor-resistor networks. That is, resistor 58 and capacitor 60 (similar to resistor 28 and capacitor 30) are connected, in parallel, between the cathode of diode 56 and one terminal of primary winding 72 of transformer $T_3$. The network comprising resistor 62 and capacitor 64 (similar to the resistor 32 and capacitor 34) has one terminal connected to the cathodes of diodes 50 and 54. The other terminal of the network is connected to a different terminal of primary winding 72. Again primary winding 72 is a center-tapped winding having its center-tap connected to a potential source, for example ground. Transformer $T_3$ is similar to transformers $T_1$ and $T_2$ and the secondary winding 74 thereof is connected to a substantially constant current source comprising potential source 88 and resistor 78 which may be about 1000 ohms. The backward diode 76 provides the desirable low impedance current path for tunnel diode 68. Tunnel diode 68 has the anode thereof connected to winding 74 and the cathode thereof returned to a potential source, for example ground. The parallel output terminal 86 is connected to the anode of tunnel diode 68. Diode 70 has the anode thereof connected to the anode of tunnel diode 68 and the cathode thereof connected to output terminal 80. It is to be understood, of course, that the output terminal 80 may in fact represent the input to an additional circuit in the sub-system. On the other hand of course, output terminal 80 may be applied to any external circuitry, as desirable.

The coupling diode 66 has the anode thereof connected to the anode of tunnel diode 68 and the cathode thereof connected to the cathode of control diode 56. Diodes 54 and 56 are the control diodes and coupling diodes 50 and 66 are the potential applying diodes which determine the operating state of the control diodes.

Figure 2:
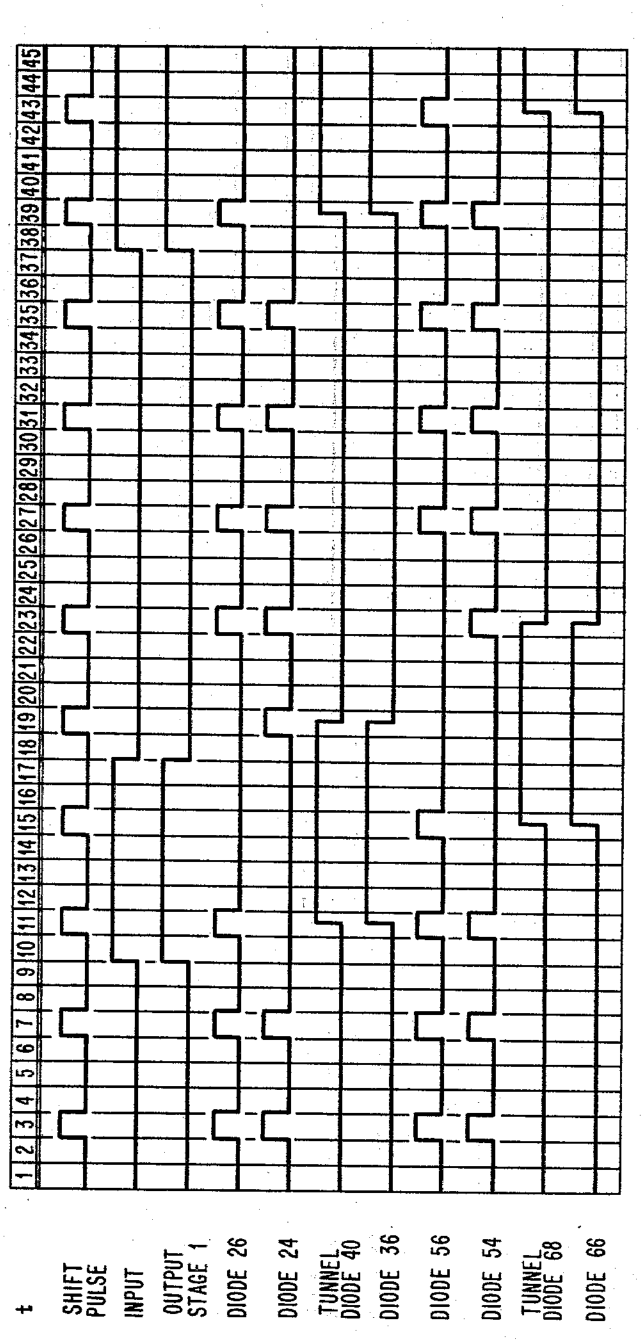
FIGURE 2 is a graphical showing of the timing diagram for the circuit shown in FIGURE 1.

The operation of the circuit shown in FIGURE 1 is more easily described by referring now to FIGURES 1 and 2 coincidentally. The shift pulse signal supplied by sources 38 and 52 is shown as occurring at periodic time intervals. The periodic pulse suggested in FIGURE 2 is not meant to be limitative of the invention, but rather is merely one type of signal which may be applied to the system. It is contemplated, that a non-regularly recurring shift pulse signal may be employed. The input signal is an arbitrarily defined signal which is supplied by the input source 10. The input signal has two levels, viz., a low level and a high level. These levels are respectively defined as the zero and one level for use with binary coding. The output of stage one, is the signal detected at the anode of tunnel diode 16. This signal has two levels which may be indicative of the bistable operating levels of the tunnel diode 16. The low level output signal indicates that the tunnel diode 16 is in the low level operating condition and the high level output signal indicates that tunnel diode 16 is in the high level operating condition. The signals indicated at diodes 24 and 26 have two levels. The low level is indicative of the situation where the potential difference across the diode is of such a magnitude or polarity that the diode is effectively reverse biased, i.e., nonconducting. This latter condition includes the zero-biased condition of the diode wherein no signal is applied to the anode of the diode. On the other hand, the high level signal at diodes 24 and 26 is indicative of the fact that the potential difference across these diodes is of such magnitude and polarity that the diodes are forward-biased and conducting. The other signal waveforms, namely the waveforms of tunnel diodes 40 and 68 and diodes 36, 56, 66 and 54 follow a similar convention.

It is initially assumed for this example only and without limiting the scope of the circuit operation that each of the tunnel diodes 16, 40 and 68 are in the low level operating or zero state. This may be accomplished by applying a reset signal to tunnel diode 16 where the reset signal is in effect a zero signal and then shifting the zero to the cascaded circuits. In the alternative, the system may be so designed that the tunnel diodes initially operate in the high level operating condition.

Referring first to stage one, the input signal supplied by input source 10 is a low level signal from time period $T_1$ through time period $T_9$. The shift pulses applied at time periods $T_3$ and $T_7$ are applied by sources 38 and 52 to the control diodes. Therefore, a high level potential is applied to the anodes of control diodes 24 and 26 for example. Inasmuch as tunnel diode 40 is defined as being in the low level operating condition at this time (see the tunnel diode 40 waveshape), diode 36 is effectively reverse-biased (see definition supra) and does not apply any substantial potential at the cathode of diode 26. Similarly, tunnel diode 16 is defined as being in the low level operating condition whereby the coupling diode 22 is effectively reverse-biased such that no significant potential is applied at the cathode of diode 24. Thus, as shown at time period $T_3$ and $T_7$, diodes 24 and 26 are each rendered conductive by the application of the positive-potential shift pulse. Since diodes 22 and 36 are reverse biased, current from the control diodes can flow only through the resistor-capacitor networks associated with each of the control diodes. This current continues through the center-tapped primary winding 44 to the potential source (ground) at the center-tap. Each of these individual signals tends to produce a signal in the secondary winding 42 of transformer $T_2$, but inasmuch as each of the signals is of substantially the same magnitude but opposite polarity, the effect of the signal is cancelled whereby no signal is produced in winding 42. In view of the absence of a signal at winding 44, tunnel diode 40 remains in the low voltage operating condition.

A similar operation occurs when the shift signal is supplied by source 52 to the control diodes 54 and 56 at time periods $T_3$, $T_7$ and $T_{11}$. That is, since the diodes 50 and 66 are effectively reverse biased because of the low level potentials supplied by the tunnel diodes 40 and 68 respectively, current flows through control diodes 54 and 56 to the center-tapped primary winding 72. The currents which flow through the winding segments of primary winding 72 to the grounded center-tap of substantially the same magnitude but of opposite polarity such that only a negligible signal, at most, is produced in winding 74. The absence of a substantial signal allows tunnel diode 68 to remain in the low voltage operating state.

At time period $T_{10}$, the input signal supplied by input source 10 becomes a high level signal. This input signal remains a high level signal through time period $T_{17}$ and is defined, for convenience, to affect only one half of the center-tapped primary winding 12. The application of the high level input signal is designed to cause a signal in the secondary winding 14 of transformer $T_1$. The additional signal produced in winding 14 (above the bias signal) is sufficient to cause tunnel diode 16 to switch from the low voltage operating state to the high voltage operating state. The additional signal is obtained through backward diode 20. That is, if source 88 and resistor 18 form an idealized constant current source the backward diode path is present, but, as noted supra, is not required if the current source is not perfectly "constant." Since the tunnel diode 16 is switched to the high voltage operating state, the output signal of stage 1 becomes a high level signal. This output signal is shown as continuing through time period $T_{17}$. It will be asumed that a reset signal supplied by source 10*a* at time period $T_{18}$ to the tunnel diode 16 such that the tunnel diode will revert to the low voltage operating condition. In the embodiment shown, the application of shift pulses at time periods $T_{11}$ and $T_{15}$ have no effect on the first stage. However, if the input device 10 was, in fact, another stage, the input signal would be initiated coincidentally with the shift signal 11. Likewise, the output signal from stage 1 would follow.

Continuing to stage 2, the shift signals are applied by source 38 to control diodes 24 and 26 at time periods $T_{11}$ and $T_{15}$. Inasmuch as tunnel diode 16 is in the high voltage operating condition, a potential, relatively positive to the anode, is applied to the cathode of control diode 24 via diode 22. Thus, diode 24 is effectively reverse biased such that current does not flow therethrough. On the other hand, diode 26 is still forward biased inasmuch as tunnel diode 40 remains in the low voltage operating condition and does not apply a high potential to the cathode of diode 26 via diode 36. Therefore, diode 26 continues to pass current therethrough. As will become obvious, in response to a shift from source 38 current flows via diode 26 and the associated network through one-half of primary winding 44 of transformer $T_2$. This current tends to induce a signal in winding 42. Inasmuch as no cancelling signal is applied via diode 24, a signal is, in fact, induced in winding 42. This signal (which may pass through backward dode 48) is defined to be of such magnitude and polarity to switch tunnel diode 40 from the low voltage to the high voltage operating condition. The change at tunnel diode 40 is accomplished during time period $T_{11}$ and not at the leading or trailing edge of the shifting pulse. A certain delay time is provided in passing the shifting signal through the resistor-capacitor network as well as the series inductance associated therewith, to assure that tunnel diode 40 does not switch to rapidly as to cause tunnel diode 68 to be switched also. However, the delay period should not be larger than the duration of the shifting signal applied by source 38 since the signal induced in winding 42 may be insufficient to switch the tunnel diode 40. Moreover, the collapsing field produced in winding 44 when the shift signal terminates will be in the opposite direction to the shift pulse and will tend to neutralize the effect of the shift pulse.

The change of state of tunnel diode 40 applies a high (relatively positive) potential level at the anode of diode 36. This potential is supplied to the cathode of diode 26. Therefore, at time period $T_{15}$ when the shift pulse is applied by source 38, diode 26 is effectively reverse biased, as is diode 24, because of the potentials supplied via diodes 22 and 36 from the tunnel diodes 16 and 40 respectively. Consequently, diodes 24 and 26 cannot pass current whereby no signals are supplied to winding 44 at time period $T_{15}$. Therefore, tunnel diode 40 remains in the high voltage operating condition.

At time period $T_{11}$, tunnel diode 68 remains in the low level operating condition but tunnel diode 40 is shifted to the high level operating condition. However, because of the delay in the system, the signal applied by source 52 has initiated a signal through diode 54 before the tunnel diode 40 switches. At time period $T_{15}$, only diode 56 is forward biased inasmuch as tunnel diode 68 remains in the low level operating condition. However, by now tunnel diode 40 has switched to the high level operating condition whereby diode 54 is effectively reverse biased via diode 50. Therefore, current flows to ground only through the upper half of primary winding 72 thereby inducing a signal in winding 74. The signal induced in winding 74 is sufficient to switch tunnel diode 68 to the high voltage operating condition. The high level potential at the anode of tunnel diode 68 is applied to the cathode of control diode 56 via coupling diode 66.

At time period $T_{18}$, the input signal supplied by source 10 becomes a low level signal. The output signal supplied by stage 1 is also a low level signal. That is, it is assumed that the tunnel diode 16 has been reset to the low voltage operating condition, for example by a signal (not shown) from reset source *10a*. Therefore, the application of a shift pulse by source 38 at time period $T_{19}$ finds diode 24 in the forward biased condition whereby current is conducted therethrough. However, diode 26 is reverse-biased inasmuch as tunnel diode 40 continues to apply a high level potential to the cathode thereof via coupling diode 36. Consequently, the current flow through control diode 24 will produce a current in the lower half of the primary winding 44. The current through winding 44 is of such a magnitude and polarity that a signal is induced in secondary winding 42 which will cause tunnel diode 40 to be reset to the low voltage operating condition. Thus, tunnel diode 40 is shown as switching to the low level operating condition during time period $T_{19}$. Again, the tunnel diode is shown as switching during the time period, and not at the leading or trailing edge thereof, because of the delay in the circuit. The potential difference across diode 36 switches when the potential at tunnel diode 40 switches.

The shift pulse supplied by source 52 at time period $T_{19}$ finds both control diodes 54 and 56 in the reverse-bias condition inasmuch as both tunnel diodes 40 and 68 are in the high voltage operating condition at the initiation of the shift signal. Because no current is passed through winding 72, there is no signal induced in winding 74. Therefore, tunnel diode 68 remains in the high voltage operating condition.

At time period $T_{23}$, the input signal remains in the low level condition as does the output signal from stage 1. Therefore, coupling diode 22 is reverse-biased. Consequently, control diode 24 is forward-biased and can pass current in accordance with the application of a shift pulse. Diode 26 is forward-biased inasmuch as tunnel diode 40 is operating in the low voltage region. Therefore, current is applied to both halves of the center-tapped primary winding 44 such that cancelling signals are applied to the secondary winding 42. Since the signals cancel one another in winding 42, tunnel diode 40 remains in the low level operating condition. Diode 36 continues to follow the operation of tunnel diode 40 and remains non-conductive.

The shift pulse supplied by source 52 at time period $T_{23}$ finds diode 54 forward biased and able to conduct current therethrough. Diode 54 is forward biased inasmuch as tunnel diode 40 is in the low operating condition and supplies no reverse-biasing potential via diode 50. However, diode 56 is in the reverse-biased operating condition inasmuch as tunnel diode 68 is in the high voltage operating condition and applies a reverse-biasing potential to the cathode of control diode 56 via coupling diode 66. Therefore, current flows only through control diode 54 to the lower half of primary winding 72. This current induces a signal in winding 74 which is of sufficient magnitude and polarity to cause tunnel diode 68 to switch to the low level operating condition. Again, tunnel diode 68 switches during time period $T_{23}$ because of delays in the circuit and coupling diode 66 follows the operation of tunnel diode 56.

At time periods $T_{27}$, $T_{31}$ and $T_{35}$, a shift pulse applied by either or both of the shifting pulse sources 38 and 52 will not cause any alteration in the circuit operation inasmuch as the input signal and output signal at stage 1 are low level signals and tunnel diodes 40 and 68 also provide low level signals. Consequently, each of the coupling diodes 22, 36, 50 and 66 are effectively reverse-biased whereby the control diodes 24, 26, 54 and 56 are forward biased. Since each of the components in the associated pairs of control diodes are forward biased, current will flow therethrough thereby creating a cancelling current or flux in the associated transformer. Because of this cancellation effect, signals sufficient in magnitude and polarity to switch the tunnel diodes 40 and 68 will not be produced in the secondary windings 42 and 74 respectively.

At time period $T_{38}$, the input signal supplied by source 10 switches from the low to the high level and the output signal produced by the stage follows. That is, tunnel diode 16 has been switched to the high voltage operating condition in accordance with the input signal. These input and output signals of stage 1 continue for the remainder of the description. Thus, the shift pulse supplied by source 38 at time period $T_{39}$ finds control diode 24 reverse-biased because of the relatively positive potential supplied to the cathode thereof by tunnel diode 16 via diode 22. However, control diode 26 continues to be forward-biased such that current flows therethrough and induces a signal in secondary winding 42 of transformer $T_2$. As described supra, this induced signal is of sufficient magnitude and proper polarity to cause tunnel diode 40 to switch to the high voltage operating state. Thus, during time period $T_{39}$, tunnel diode 40 switches to the high level operating condition. Similarly, coupling diodes 36 and 50 follow the operation of tunnel diode 40. However, as described supra, there is a delay prior to the forward biasing of diode 50. Therefore, the application of the shifting pulse at time period $T_{39}$ finds both control diodes 54 and 56 in the forward biased condition and cancelling current signals are applied to the two halves of primary winding 72 whereby no signal is induced in the secondary winding 74 of Transformer $T_3$. Therefore, tunnel diode 68 remains in the low level operating condition.

At time period $T_{43}$, a further shifting pulse is supplied. Inasmuch as tunnel diode 16 is still in the high level operating condition, a reverse-biasing potential is applied to the cathode of diode 24 via diode 22. In addition, tunnel diode 40 is in the high level operating condition whereby a reverse-biasing potential is applied to the cathode of control diode 26 via diode 36. Therefore, both control diodes are reverse-biased whereby no current is applied to the primary winding 44 of transformer $T_2$. Thus, tunnel diode 40 remains in the high level operating condition.

For stage 3, however, only control diode 54 is reverse-biased because of a high level potential applied to the cathode thereof by tunnel diode 40 via diode 50. Control diode 56 is forward-biased inasmuch as tunnel diode 68 remains in the low-voltage operating condition whereby coupling diode 66 is reverse-biased. Consequently, a current is applied only to the upper-half of primary winding 72 of transformer $T_3$ in response to the shift-pulse signal applied at time period $T_{43}$. This current induces a signal in secondary winding 74 which is of the magnitude and polarity to cause tunnel diode 68 to which the high-level operating condition during time period $T_{43}$. Clearly, coupling diode 66 follows tunnel diode 68 and applies a reverse-biasing potential to the cathode of diode 56. In addition, output coupling diode 70 also becomes forward biased when tunnel diode 68 is in the high voltage state.

Thus, the description of the operation indicates the operating characteristics of a shifting register. When a binary one signal is applied to the input stage, the one signal shifts down the register until it is stored in the final stage. That is, each of the stages initially may have a binary zero stored therein. A binary one is then stored in stage 1. This binary one is shifted to stage 2, and to stage 3, and so forth for all of the stages in the register. The input is reset or altered, when desired, by the application of a binary zero and it may be seen that the binary zero then switches down the shifting register until each of the stages is in the zero state.

It is to be understood of course, that the ones and zeros of the binary system are arbitrarily shown and may, in fact, have reversed polarities. Furthermore, the graphical representation of these signals may be considered as being positive at a high level and ground at the low level. However, this convention need not be required and the high level signals may represent a ground level and the low level signals a negative potential. Other variations are, of course, possible.

Figure 3:
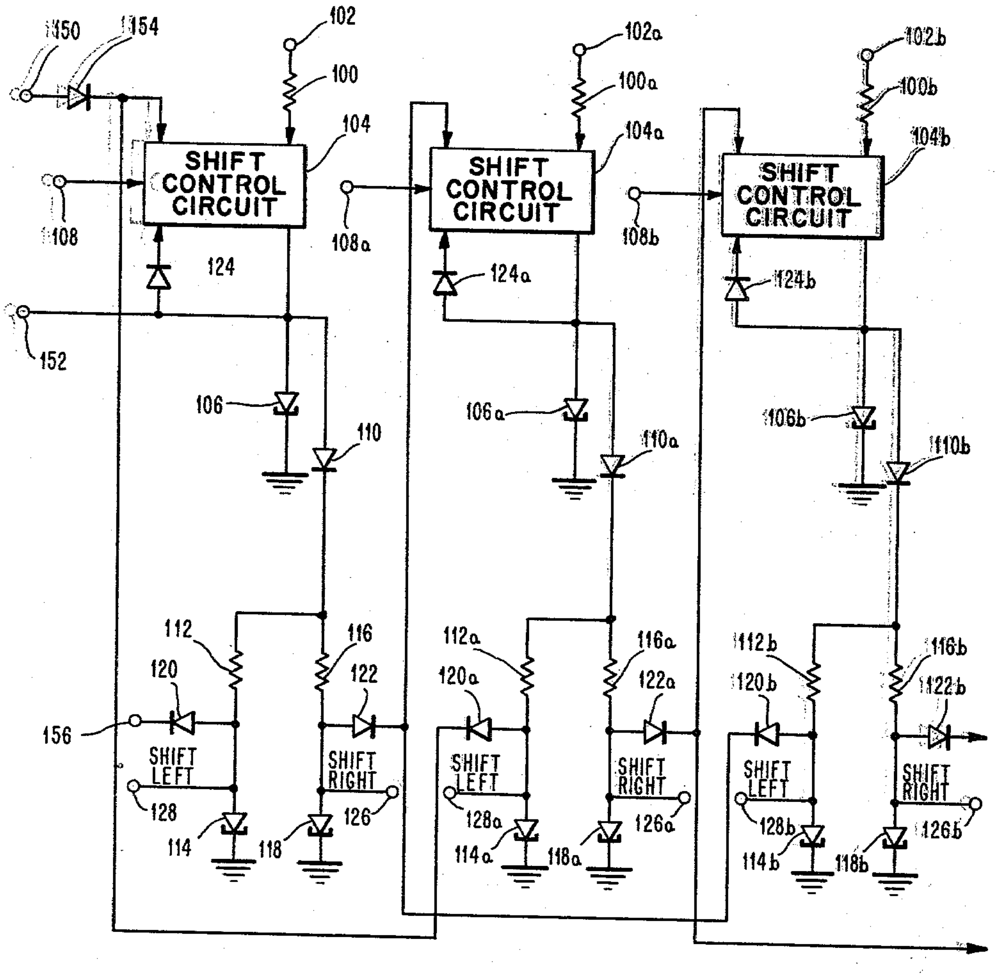
FIGURE 3 is a schematic diagram of a three-stage shifting register wherein each stage represents one embodiment of the instant circuit.

Referring now to FIGURE 3, there is shown another embodiment of the circuit wherein it is possible to shift stored information to the left or right. There is shown a shift register comprising three separate stages. Of course, the shift register may, in fact, incorporate more than the stages shown. For convenience, identical components in the three circuits bear similar reference numerals with the exception that suffixes *a* and *b* are included to distinguish separate stages. In this embodiment, potential source 102 and resistor 100 form a substantially constant current source similar to that shown and described in FIGURE 1. Tunnel diode 106 corresponds to the tunnel diode in one of the stages of the shift register shown and described in FIGURE 1 and is biased in the bistable operating condition by the constant current source comprising source 102 and resistor 100. Shift control circuit 104 indicates the circuitry comprising the control diodes, the R-C circuits and the transformer shown in FIGURE 1. Source 108 is a shift pulse source, similar to that described in FIGURE 1, connected to the shift control circuit for supplying periodic signals thereto. Diode 124 connected between the anode of tunnel diode 106 and the shift control circuit 104 corresponds to one of the coupling diodes shown in FIGURE 1. In particular, diode 124 supplies the potential which inhibits the storage of a binary one in the associated storage tunnel diode. The diode 110, which has the anode thereof connected to the anode of tunnel diode 106, is similar to the output coupling diode described in FIGURE 1 in that it provides the output path between adjacent stages. The cathode of diode 110 is connected to biasing resistors 112 and 116. Each of the biasing resistors is connected to a different tunnel diode. Thus, resistor 112 is connected to the anode of tunnel diode 114 which has the cathode thereof connected to ground. Likewise, resistor 116 is connected to the anode of tunnel diode 118 which has the cathode thereof connected to ground. The tunnel diode may be similar to the tunnel diode previously described. The biasing resistors which may be about 50 ohms, are so chosen that the tunnel diodes operate in the monostable mode. That is, the operating load-line intersects the tunnel diode characteristic curve at one point only.

The shift left source 128 is connected to the anode of tunnel diode 114. Similarly, shift right source 126 is connected to the anode of tunnel diode 118. Sources 126 and 128 are conventional signal sources capable of supplying a synchronous or an asynchronous signal which is a positive signal with respect to ground. In addition, sources 126 and 128 may be mutually exclusive. Shift left diode 120 has the anode thereof connected to the anode of tunnel diode 114. The cathode of shift left coupling diode 120 is connected to an input circuit, for example a circuit similar to shift control circuit 104. Therefore, coupling diode 120 also corresponds to the output coupling diode described in FIGURE 1. Shift right coupling diode 122 which has the anode thereof connected to the anode of tunnel diode 118 has the cathode thereof connected to shift control circuit 104*a*. Therefore, the shift left or shift right coupling diodes 120 and 122 respectively may be considered to be similar to the output coupling diode discussed in FIGURE 1 except that the output may now be applied to different stages. Of course, if there are no appropriate adjacent stages, the shift-left or shift-right coupling diodes may be eliminated.

The circuit connections of the additional stages are virtually identical with the exception that the shift-left and shift-right coupling diodes are connected to the shift control circuits of the immediately adjacent stages to the left or right of the immediate stage.

The operation of the system utilizing the left-shift or right-shift control is substantially similar to the operation of the shift circuit discussed supra. Thus, it is assumed that each of the storage tunnel diodes 106, 106*a* and 106*b*, are initially in the zero or low level operating condition. It is assumed that a relatively positive potential signal is applied to input terminal 150. This signal is applied to the shift control circuit 104 via coupling diode 154 and, as described supra, reverse-biases one of the control diodes such that a binary zero cannot be stored in tunnel diode 106. However, the other control diode is forward-biased since coupling diode 124 is reverse-biased, i.e. tunnel diode 106 is in the low voltage state. Thus, with the application of a shift pulse signal to source 108, a signal will be induced in the secondary winding of the transformer (shown in FIGURE 1) such that a signal is supplied to tunnel diode 106 thereby shifting the tunnel diode to the high voltage operating or binary one condition. A more positive potential is, therefore, applied to each of tunnel diodes 114 and 118 via diode 110 and resistors 112 and 116. Since the tunnel diodes were originally biased at a very low-potential operating-point in the monostable operating region (even in the low voltage region tunnel diode 106 supplies a small positive potential), the application of the more positive potential via diode 110 shifts the operating point of the tunnel diodes nearer to the peak of its characteristics. However, with proper choice of resistors 112 and 116 in view of the potential swing at tunnel diode 106, the tunnel diodes 114 and 118 remain in the monostable operating condition and will not switch to the high voltage operating region. However, with the application of a shift-left or shift-right signal by the appropriate source, the effected tunnel diode will switch to the high voltage operating condition. That is, the coincident occurrence of an output coupling signal, via diode 110, and a shift signal from source 126 or 128 will switch the proper tunnel diode. However, the separate occurrence of one or the other of these signals will only shift the tunnel diode operating point within the low voltage region but will not switch it to the high voltage region.

For convenience, it will be assumed that a shift-right signal is applied. In view of the coincident coupling signal and shift signals, tunnel diode 118 is switched to the high voltage operating condition whereby the coupling diode 122 becomes forward biased. Since diode 122 is forward biased, the "zero applying" control diode in shift control circuit 104*a* is reversed biased. Therefore, the application of a shift pulse signal by source 108*a* creates a signal in shift control circuit 104*a* whereby tunnel diode 106*a* is switched to the high voltage operating condition. Thus, a binary one is shifted from one stage to the next.

If now a further shift right signal is supplied by source 126*a*, tunnel diode 118*a* will shift to the high voltage operating condition (tunnel diode 106*a* is already in the high state) whereby a reverse biasing potential will be supplied to shift control circuit 104*b* via diode 122*a*. The subsequent application of a shift pulse signal by source 108*b* will cause a signal to be produced such that tunnel diode 106*b* is switched to the high voltage operating region. Coupling diodes 120*b* and 122*b* are conditioned for shifting signals in response to shift signals from source 128*b* and 126*b* respectively. Thus, by the application of a binary one to tunnel diode 106, and the application of shift right signals prior to the application of shift pulse signals, a binary one signal may be shifted along the shift register from one stage to the adjacent stage on the right thereof and ultimately stored in each of the stages.

Similar system operation may be shown to define the shift-left operation. Assume that tunnel diodes 106 and 106*a* are in the zero or low level operating region while tunnel diode 106*b* is in the binary one or high voltage operating region. Therefore, a high potential is applied to tunnel diodes 114*b* and 118*b* via diode 110*b* and the respective resistors 112*b* and 116*b*. With the application of a shift left signal by source 128*b*, tunnel diode 114*b* shifts to the high voltage state. Thus, a reverse biasing potential is supplied via diode 120*b* to the binary zero control diode in shift control circuit 104*a*. The subsequent application of a shift pulse signal by source 108*a* causes a signal to be produced in tunnel diode 106*a* such that the tunnel diode switches to the high voltage operating condition. Again, this provides a relatively positive potential which is supplied to tunnel diodes 114*a* and 118*a* via diode 110*a*. A shift left signal will apply a reverse biasing potential at the binary zero control diode in shift control circuit 104 via coupling diode 120*a*. Thus, it may be seen that the application of the pertinent shift-left or shift-right signal, determines which of the coupling diodes will be shifted to the high voltage condition whereby a reverse-biasing potential is applied to the adjacent shift control circuit.

It should be abundantly clear, that the suggested components and the parameters thereof are not meant to be limitative of the invention but are rather suggested to provide preferred embodiments. Modifications may be made to the circuits with certain desirable results, as for example the elimination of the backward diode as noted supra. However, any modification of the circuit which does not alter the inventive percepts or concepts of the circuit are meant to be included within the scope of this description.

The embodiments of the invention in which an exclusive property or privilege is claimed are defined as follows:

1. In combination, bistable semi-conductor means,
bias means for biasing said bistable means to one stable state,
input means for supplying periodic signals,
coupling means connected to said bistable means,
non-linear impedance means connected between said input means and said coupling means such that signals supplied by said input means may be supplied to said bistable semi-conductor means via said coupling means in accordance with the impedance of said non-linear impedance means,
decoupling means connected to said non-linear impedance means and operative to vary the impedance thereof whereby said coupling means may be selectively decoupled from said input means, and
output means connected to said bistable semiconductor means.

2. In combination, bistable means,
bias means for biasing said bistable means to one stable state,
input signal supplying means,
transformer coupling means having one winding connected to said bistable means,
non-linear impedance means connected between said input means and another winding of said transformer coupling means,
and means connected to said non-linear impedance means whereby the impedance thereof may be varied such that said transformer coupling means may be selectively decoupled from said input means such that a signal supplied by said input means cannot be applied to said bistable means.

3. A switching circuit comprising, bistable means,
bias means for biasing said bistable means to one stable state,
input means,
coupling means connected to said bistable means, a pair of unidirectional conducting means connected in parallel between said input means and said coupling means,
and separate decoupling means connected to each of said unidirectional conducting means such that signals may be applied thereto whereby said coupling means may be selectively decoupled from said input means.

4. In a switching circuit,
a tunnel diode,
means for biasing said tunnel diode to one stable operating state of a bistable mode,
a first transformer winding connected to said tunnel diode for coupling signals to the tunnel diode,
input means for supplying periodic signals,
a second transformer winding inductively coupled to said first transformer winding,
a pair of rectifier diodes,
each of said pair of diodes having one electrode thereof connected to said input means and another electrode thereof connected to different terminals of said second transformer winding whereby the signals supplied by said input means may be supplied to said second transformer winding,
and control means connected to each of said diodes such that said diodes may be selectively disabled whereby signals will not be passed from said input means to said second transformer winding.

5. In a switching circuit,
a tunnel diode,
means for biasing said tunnel diode to one stable operating state of a bistable mode,
a first transformer winding connected to said tunnel diode for coupling signals to the tunnel diode,
input means for supplying periodic signals,
a second transformer winding inductively coupled to said first transformer winding,
first and second rectifier diodes, each of said first and second diodes having the anode thereof connected to said input means and the cathode thereof connected to different terminals of said second transformer winding whereby the signals supplied by said input means may be selectively supplied to said second transformer winding,
third and fourth rectifier diodes having the cathodes thereof connected to the cathodes of each of said first and second diodes such that said first and second diodes may be selectively disabled whereby signals will not be passed from said input means to said second transformer winding, and
output means connected to said tunnel diode.

6. A shift register having a plurality of stages,
each of said stages comprising,
a tunnel diode,
means for biasing said tunnel diode to one stable operating state of a bistable mode,
a first transformer winding connected to said tunnel diode for coupling signals to the tunnel diode,
input means for supplying periodic signals,
a second transformer winding inductively coupled to said first transformer winding,
a pair of rectifier diodes each of said pair of diodes having one electrode thereof connected to said input means and another electrode thereof connected to different terminals of said second transformer winding whereby the signals supplied by said input means may be supplied to said second transformer winding,
and separate control means connected to each of said diodes such that said diodes may be selectively disabled whereby signals will not be passed from said input means to said second transformer winding,
at least one of said control means being connected to the tunnel diode of an adjacent stage.

7. In a switching circuit,
a tunnel diode, means for biasing said tunnel diode to one stable operating state of a bistable mode,
a first transformer winding connected to said tunnel diode for coupling signals to the tunnel diode,
input means for supplying periodic signals,
a second transformer winding inductively coupled to said first transformer winding,
said second transformer winding having the center tap thereof returned to a reference potential,
a pair of rectifier diodes, each of said pair of diodes having one electrode thereof connected to said input means and another electrode thereof connected to different terminals of said second transformer winding whereby the signals supplied by said input means may be supplied to said second transformer winding in an opposite sense,
separate control means connected to each of said diodes such that said diodes may be selectively disabled whereby certain signals will not be passed from said input means to said second transformer winding,
one of said separate control means being further connected to said tunnel diode in order to provide a feedback path such that at least one of said pair of rectifier diodes is controlled by said tunnel diode,
and output means connected to said tunnel diode.

8. In combination,
bistable semi-conductor means,
bias means for biasing said bistable means to one stable state,
means for supplying periodic signals,
coupling means connected to said bistable means,
a plurality of non-linear impedance means connected between said signal supplying means and said coupling means such that signals supplied by said signal supplying means may be supplied to said bistable semiconductor means via said coupling means in accordance with the impedance of said non-linear impedance means,
each of said non-linear impedance means connected to a different terminal of said coupling means such that signals may be supplied thereto in different sense,
separate decoupling means connected to each of said non-linear impedance means and operative to vary the impedance thereof whereby said coupling means may be selectively decoupled from said signal supplying means,
control means connected to at least one of said separate decoupling means, and
output means connected to said bistable semiconductor means.

9. In combination, a plurality of cascaded circuits which form a shift register, each of said cascaded circuits comprising,
bistable semi-conductor means,
bias means for biasing said bistable means to one stable state,
input means for supplying periodic signals,
coupling means connected to said bistable means,
separate non-linear impedance means connected between said input means and different terminals on said coupling means such that signals supplied by said input means may be selectively supplied in different sense to said bistable semiconductor means in accordance with the impedance of said separate non-linear impedance means,
separate decoupling means connected to each of said non-linear impedance means and operative to vary the impedance thereof whereby said coupling means may be selectively decoupled from said input means,
at least one of said decoupling means being connected to the bistable semi-conductor means of an adjacent cascaded circuit,
at least one of said decoupling means being connected to said bistable semi-conductor means and said non-linear impedance in the same circuit, and
output means connected to said bistable semiconductor means.

10. In combination, bistable means, bias means for biasing said bistable means to one stable state, input means, coupling means connected to said bistable means and said bias means, non-linear impedance means connected between said input means and said coupling means, said coupling means, said bias means and said bistable means being connected together in series, and decoupling means connected to said non-linear impedance means whereby said coupling means may be selectively decoupled from said input means.

References Cited by the Examiner

UNITED STATES PATENTS

| | | | |
|---|---|---|---|
| 2,922,985 | 1/60 | Crawford. | |
| 3,097,312 | 7/63 | Miller | 307—88.5 |
| 3,121,176 | 2/64 | Burns | 307—88.5 |

OTHER REFERENCES

"The Tunnel Diode Circuit Design Handbook," published by Transistor Electronic Corp., A–1359A, page 11, March 1961.

ARTHUR GAUSS, *Primary Examiner.*